United States Patent
England

(10) Patent No.: US 7,854,114 B2
(45) Date of Patent: Dec. 21, 2010

(54) INCREASING EXHAUST TEMPERATURE FOR AFTERTREATMENT OPERATION

(75) Inventor: Roger D. England, Columbus, IN (US)

(73) Assignee: Cummins Inc., Columbus, IN (US)

( * ) Notice: Subject to any disclaimer, the term of this patent is extended or adjusted under 35 U.S.C. 154(b) by 758 days.

(21) Appl. No.: 11/376,845

(22) Filed: Mar. 16, 2006

(65) Prior Publication Data

US 2007/0214772 A1   Sep. 20, 2007

(51) Int. Cl.
*F01N 3/00* (2006.01)
(52) U.S. Cl. .............................. 60/284; 60/274; 60/285; 60/300; 123/198 F; 123/339.1; 123/339.12; 123/339.19; 123/481
(58) Field of Classification Search .................. 60/274, 60/280, 284, 285, 290, 300; 123/198 F, 406.23, 123/406.24, 406.44, 481, 493, 339.1, 339.12, 123/339.19, 339.22, 339.24
See application file for complete search history.

(56) References Cited

U.S. PATENT DOCUMENTS

| | | | |
|---|---|---|---|
| 5,117,790 A | | 6/1992 | Clarke et al. |
| 5,436,216 A | | 7/1995 | Toyao et al. |
| 5,930,992 A | * | 8/1999 | Esch et al. .................... 60/274 |
| 6,023,929 A | * | 2/2000 | Ma ............................. 60/295 |
| 6,314,735 B1 | | 11/2001 | Kolmanovsky et al. |
| 6,568,173 B1 | | 5/2003 | Kolmanovsky et al. |
| 6,594,990 B2 | | 7/2003 | Kuenstler et al. |
| 6,622,480 B2 | | 9/2003 | Tashiro et al. |
| 6,668,546 B2 | * | 12/2003 | Hayman et al. ............... 60/284 |
| 6,684,849 B2 | | 2/2004 | zur Loye et al. |
| 6,711,892 B2 | | 3/2004 | Tamura et al. |
| 6,732,505 B2 | * | 5/2004 | Miyashita ..................... 60/284 |
| 6,732,506 B2 | * | 5/2004 | Patterson et al. .............. 60/285 |
| 6,785,603 B2 | | 8/2004 | Inoue |
| 6,829,890 B2 | | 12/2004 | Gui et al. |
| 6,857,264 B2 | * | 2/2005 | Ament ......................... 60/284 |
| 6,868,667 B2 | * | 3/2005 | Surnilla ........................ 60/285 |
| 6,904,752 B2 | | 6/2005 | Foster et al. |
| 6,910,329 B2 | | 6/2005 | Bunting et al. |
| 6,988,361 B2 | * | 1/2006 | van Nieuwstadt et al. ..... 60/295 |
| 7,021,046 B2 | * | 4/2006 | Surnilla et al. ................ 60/285 |
| 2003/0221416 A1 | | 12/2003 | Ingram et al. |
| 2004/0200213 A1 | | 10/2004 | Igarashi et al. |

\* cited by examiner

*Primary Examiner*—Tu M Nguyen
(74) *Attorney, Agent, or Firm*—Krieg DeVault LLP; J. Bruce Schelkopf; L. Scott Paynter

(57) ABSTRACT

One embodiment of the present invention includes an internal combustion engine system designed to increase exhaust temperature when operating with a low mechanical load—such as idle operation. This increased exhaust temperature is provided to operate aftertreatment equipment. Exhaust temperature is raised by operating a portion of the engine pistons in a brake mode to increase loading on a remainder of the pistons operating in a combustion mode to drive the engine. Fuel provided to pistons operating in the combustion mode is regulated to maintain speed of the engine within a desired idle speed range.

20 Claims, 2 Drawing Sheets

INCREASING EXHAUST TEMPERATURE FOR AFTERTREATMENT OPERATION

BACKGROUND

The present invention relates to operation of an engine with aftertreatment, and more particularly, but not exclusively relates to increasing exhaust temperature for aftertreatment during engine operation with a low load.

Various aftertreatment subsystems have been developed to control exhaust emissions from internal combustion engines. The performance of aftertreatment subsystems often varies with temperature, which has led to the development of various thermal management schemes. Unfortunately, these schemes often fall short of performance goals when the engine operates with a relatively light load because desired temperature levels are difficult to reliably attain. Thus, there is a continuing demand for further contributions in this area of technology.

SUMMARY

One embodiment of the present invention includes a unique technique to regulate operation of an internal combustion engine. Other embodiments include unique apparatus, devices, systems, and methods involving the control of an internal combustion engine with temperature-dependent aftertreatment. Further embodiments, forms, objects, features, advantages, aspects, and benefits of the present application shall become apparent from the detailed description and drawings included herein.

DETAILED DESCRIPTION OF REPRESENTATIVE EMBODIMENTS

Figure 1:
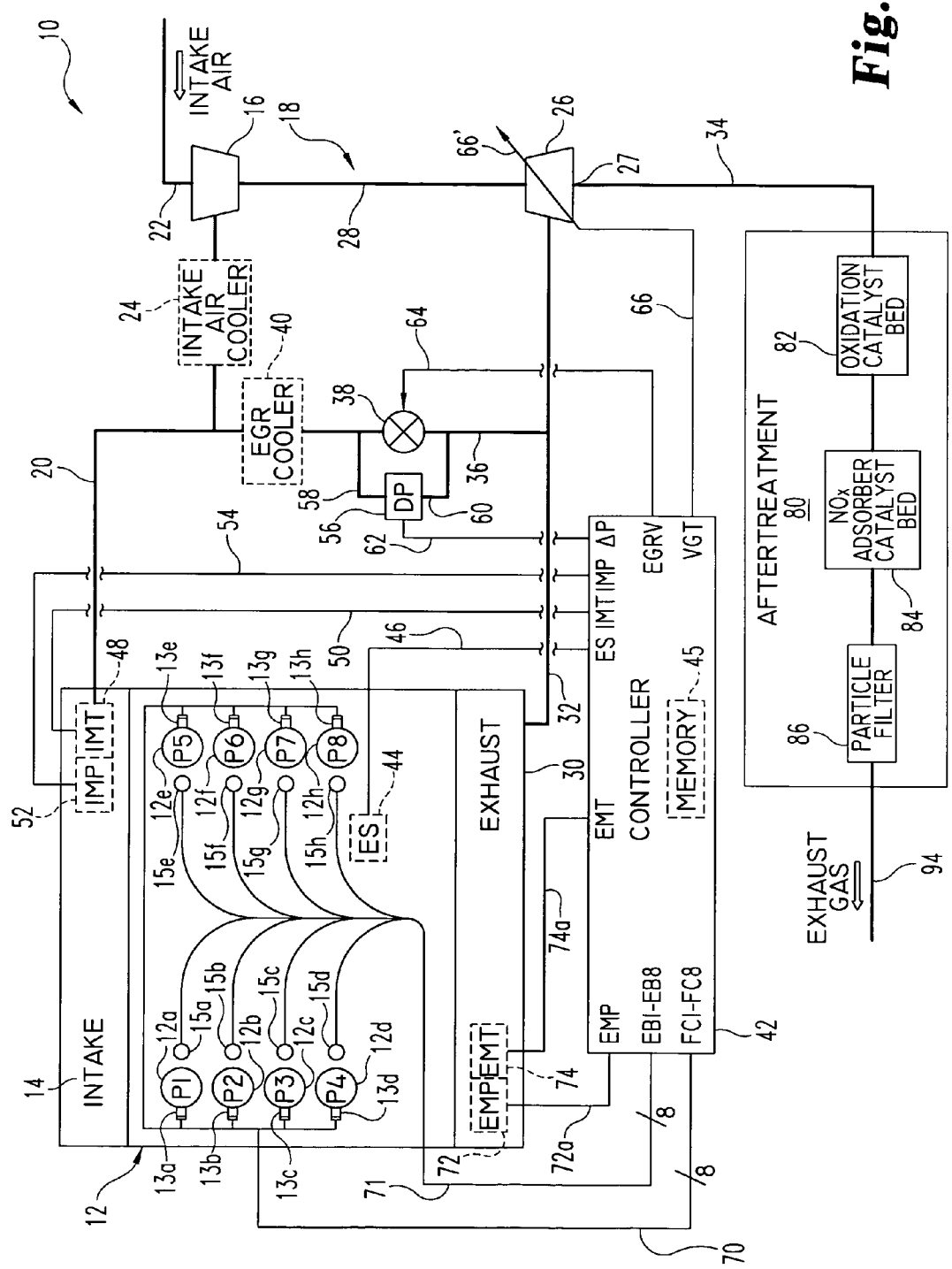
FIG. 1 is a diagrammatic view of an internal combustion engine system including aftertreatment equipment.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

One embodiment of the present invention includes increasing exhaust temperature while an engine operates with a light mechanical load to heat aftertreatment equipment to a desired level. This increase is provided by operating a portion of the engine cylinders in an exhaust brake mode with one or more remaining cylinders operating in a combustion mode. In one form, the low engine load corresponds to an idle condition, and idle speed of the engine is maintained within a desired range by adjusting fueling to the one or more cylinders operating in the combustion mode while the other cylinders operate in the exhaust brake mode.

FIG. 1 shows an engine system 10 of another embodiment of the present invention. System 10 includes an internal combustion engine 12 having an intake manifold 14 fluidly coupled to an outlet of a compressor 16 of a turbocharger 18 via an intake conduit 20. Compressor 16 includes a compressor inlet coupled to an intake conduit 22 for receiving fresh air therefrom. Optionally, as shown in phantom in FIG. 1, system 10 may include an intake air cooler 24 of known construction disposed in line with intake conduit 20 between compressor 16 and intake manifold 14. The turbocharger compressor 16 is mechanically coupled to a turbocharger turbine 26 via a drive shaft 28. Turbine 26 includes a turbine inlet fluidly coupled to an exhaust manifold 30 of engine 12 via an exhaust conduit 32. Collectively, conduit 20, intake manifold 14, engine 12, exhaust manifold 30, and conduit 32 define a pathway 33 along which gas flows from compressor 16 to turbine 26 during nominal operation of engine 12. Engine 12 can be of any type.

For the depicted embodiment, engine 12 is of a reciprocating piston type with four stroke operation, and runs on diesel fuel received by direct or port injection with compression ignition. More specifically, as schematically represented in FIG. 1, engine 12 includes eight pistons P1-P8 that are disposed in cylinders 12a-12h, respectively. Pistons P1-P8 are each connected to a crankshaft by a corresponding connecting rod (not shown) to reciprocally move within the respective cylinder 12a-12h in a standard manner for four stroke engine operation. Each cylinder 12a-12h includes a combustion chamber with appropriate intake and exhaust valves (not shown) and fuel injectors 13a-13h, respectively. Fuel injectors 13a-13h are of a standard type that operate in response to signals from electronic controls described in greater detail hereinafter. Fuel injectors 13a-13h receive fuel from a fuel source (not shown) in fluid communication therewith. Engine 12 further includes an engine brake subsystem that is individually controllable for each cylinder 12a-12h as designated by engine brake actuators 15a-15h, respectively. In one form, engine brake actuators 15a-15h each hold open a respective exhaust valve when activated, which more particularly provides an exhaust brake mode of operation, such that air is pumped in and out of the respective cylinder 12a-12h through the open valve. Alternatively or additionally, in other embodiments, engine 12 may operate with a different type of fuel, may be of a carburetor type, may have a different ignition approach, and/or otherwise differ as would occur to those skilled in the art.

An EGR valve 38 is disposed in-line with an EGR conduit 36 fluidly coupled at one end to intake conduit 20 and at an opposite end to exhaust conduit 32. An EGR cooler 40 of known construction may optionally be disposed in-line with EGR conduit 36 between EGR valve 38 and intake conduit 20 as shown in phantom in FIG. 1.

System 10 includes a controller 42 that is generally operable to control and manage operational aspects of engine 12. Controller 42 includes memory 45 as well as a number of inputs and outputs for interfacing with various sensors and systems coupled to engine 12. Controller 42 can be an electronic circuit comprised of one or more components, including digital circuitry, analog circuitry, or both. Controller 42 may be a software and/or firmware programmable type; a hardwired, dedicated state machine; or a combination of these. In one embodiment, controller 42 is of a programmable microcontroller solid-state integrated circuit type that includes memory 45 and one or more central processing units. Memory 45 can be comprised of one or more components and can be of any volatile or nonvolatile type, including the solid-state variety, the optical media variety, the magnetic variety, a combination of these, or such different arrangement as would occur to those skilled in the art. Controller 42 can include signal conditioners, signal format converters (such as analog-to-digital and digital-to-analog converters), limiters, clamps, filters, and the like as needed to perform various control and regulation operations described herein. Controller 42, in one embodiment, may be a standard type sometimes referred to as an electronic or engine control module (ECM), electronic or engine control unit (ECU) or the like, that is directed to the regulation and control of overall engine operation. Alternatively, controller 42 may be dedicated to control of just the operations described herein or to a subset of controlled aspects of engine 12. In any case, controller 42 preferably includes one or more control algorithms defined by operating logic in the form of software instructions, hardware instructions, dedicated hardware, or the like. These algorithms will be described in greater detail hereinafter, for controlling operation of various aspects of system 10.

Controller 42 includes a number of inputs for receiving signals from various sensors or sensing systems associated with system 10. For example, system 10 includes an engine speed sensor 44 electrically connected to an engine speed input, ES, of controller 42 via signal path 46. Engine speed sensor 44 is operable to sense rotational speed of the engine 12 and produce an engine speed signal on signal path 46 indicative of engine rotational speed. In one embodiment, sensor 44 is a Hall effect sensor operable to determine engine speed by sensing passage thereby of a number of equi-angularly spaced teeth formed on a gear or tone wheel. Alternatively, engine speed sensor 44 may be any other known sensor operable as just described including, but not limited to, a variable reluctance sensor or the like.

System 10 further includes an intake manifold temperature sensor 48 disposed in fluid communication with the intake manifold 14 of engine 12, and electrically connected to an intake manifold temperature input (IMT) of controller 42 via signal path 50. Intake manifold temperature sensor 48 may be of known construction, and is operable to produce a temperature signal on signal path 50 indicative of the temperature of air charge flowing into the intake manifold 14, wherein the air charge flowing into the intake manifold 14 is generally made up of fresh air supplied by the turbocharger compressor 16 combined with recirculated exhaust gas supplied by EGR valve 38.

System 10 further includes an intake manifold pressure sensor 52 disposed in fluid communication with intake manifold 14 and electrically connected to an intake manifold pressure input (IMP) of controller 42 via signal path 54. Alternatively, pressure sensor 52 may be disposed in fluid communication with intake conduit 20. In any case, pressure sensor 52 may be of known construction, and is operable to produce a pressure signal on signal path 54 indicative of air pressure within intake conduit 20 and intake manifold 14.

System 10 also includes an exhaust manifold pressure sensor 72 disposed in fluid communication with exhaust manifold 30 and electrically connected to an exhaust manifold pressure input (EMP) of controller 42 via signal path 72*a*. Alternatively, pressure sensor 72 may be disposed in the fluid communication with exhaust conduit 32. In any case, pressure sensor 72 may be of known construction and is operable to produce pressure signal on signal path 72*a* indicative of gas pressure within exhaust conduit 32 and exhaust manifold 30.

System 10 further includes a differential pressure sensor, or DP sensor, 56 fluidly coupled at one end to EGR conduit 36 adjacent to an exhaust gas inlet of EGR valve 38 via conduit 60, and fluidly coupled at its opposite end to EGR conduit 36 adjacent to an exhaust gas outlet of EGR valve 38 via conduit 58. Alternatively, DP sensor 56 may be coupled across another flow restriction mechanism disposed in-line with EGR conduit 36. In either case, the DP sensor 56 may be of known construction and is electrically connected to a DP input of controller 42 via signal path 62. DP sensor 62 is operable to provide a differential pressure signal on signal path 62 indicative of the pressure differential across EGR valve 38 or other flow restriction mechanism disposed in-line with EGR conduit 36. Nonetheless, it should be recognized that in other embodiments EGR valve 38, DP sensor 56, and associated conduits, coolers, and the like, may be absent.

Controller 42 also includes a number of outputs for controlling one or more engine functions associated with system 10. For example, EGR valve 38 is electrically connected to an EGR valve output (EGRV) of controller 42 via signal path 64. Controller 42 is operable, as is known in the art, to produce an EGR valve control signal on signal path 64 to correspondingly control the position of EGR valve 38 relative to a reference position in a known manner. Controller 42 is accordingly operable to control EGR valve 38 to selectively provide a flow of recirculated exhaust gas from exhaust manifold 30 to intake manifold 14. Accordingly, while composition of gas flowing along pathway 33 changes from: (a) compressed air, (b) to an air/fuel charge, and then (c) to exhaust—when EGR valve 38 is closed—such composition may also include various amounts of recirculated exhaust gas when EGR valve 38 is open.

Controller 42 also includes at least one output, VGT, for controlling operation of a variable geometry turbine (VGT) mechanism 66' that is included in turbocharger 18. VGT mechanism 66' is schematically illustrated in FIG. 1 and is operatively connected to the VGT output via signal path 66. Controller 42 is operable to produce a variable geometry turbocharger control signal on signal path 66 to control the swallowing capacity (i.e., exhaust gas flow capacity) of turbine 26 by controlling the flow geometry of turbine 26 in a standard manner.

Another control mechanism that optionally may be included within system 10 is an electronically controllable wastegate valve (not shown) having a wastegate valve actuator (not shown) electrically connected to controller 42. The wastegate valve has an inlet fluidly coupled to exhaust conduit 32, and an outlet fluidly coupled to exhaust conduit 34. Controller 42 is operable to produce a wastegate valve control signal to control the position of the wastegate valve relative to a reference position. The position of the wastegate valve defines a cross-sectional flow area therethrough, and by controlling the cross-sectional flow area of the wastegate valve, controller 42 is operable to selectively divert exhaust gas away from turbine 26, and thereby control the swallowing efficiency of turbine 26.

Controller includes a separate output FC1 through FC-8 (also collectively designed fuel command outputs FC) to control operation of each fuel injector 13*a*-13*h*, respectively. The signal paths for outputs FC are also collectively designated by reference numeral 70 in FIG. 1; however, it should be understood that the timing of fuel injected by each injector 13*a*-13*h* can be independently controlled for each piston P1-P8 with controller 42. In addition to the timing of fuel injection, controller 42 can also regulate the amount of fuel injected. Typically, fuel amount varies with the number and duration of injector-activating pulses provided to injectors 13*a*-13*h*. Furthermore, controller 42 can direct the withholding of fuel from one or more cylinders 12*a*-12*h* (and pistons P1-P8) for a desired period of time.

Such withholding of fuel is typically performed in coordination with activation of each corresponding engine brake actuator 15*a*-15*h*. Controller 42 includes separate outputs EB1-EB8 (also collectively designated engine brake command outputs EB) to respectively activate and deactivate engine brake actuators 15a-15h. The signal paths for outputs EB are also collectively designated by reference numeral 71 in FIG. 1; however, it should be understood that the timing and activation of actuators 15a-15h can be independently controlled for each piston P1-P8 with controller 42. In one alternative embodiment, engine brake actuators 15a-15h are actuatable in sets each numbering more than one. In still another embodiment, actuators 15a-15h or some subset thereof can be manually activated in response to an operator input, such as may be desired during downhill travel for a heavy duty application. In still other embodiments, such alternatives are not available. Accordingly, while withholding fuel from a portion of cylinders 12a-12h, an engine braking mode of operation can be realized for such cylinders 12a-12h, while one or more other cylinders 12a-12h continue to operate in a combustion mode. In yet other alternatives, fueling may selectively take place at some level for at least a portion of the cylinders 12a-12h during engine brake operation to provide a rich mixture to enhance certain aftertreatment operations or the like.

System 10 also includes aftertreatment equipment 80 to provide for aftertreatment of exhaust gases before discharge through a conduit 94. During engine operation, exhaust gas flows from turbine outlet 27 through exhaust conduit 34 in fluid communication therewith. Conduit 34 is also in fluid communication with aftertreatment equipment 80 which receives the exhaust gas from turbine 26 for aftertreatment. Aftertreatment equipment 80 can include a number of devices to chemically convert and/or remove undesirable constituents from the exhaust stream before discharge into the environment. Specifically, aftertreatment equipment 80 includes an oxidation catalyst bed 82 directed to the conversion of NO to $NO_2$, the selective generation of molecular hydrogen ($H_2$) and/or CO for regeneration, and the like; adsorber catalyst bed 84 directed to the selective trapping of nitrogen oxide and/or sulfur oxide compounds; and a particle filter 86 directed to the capture of particulate matter contained in the exhaust stream, including soot and the like. For nominal operation the temperature of at least some portions of aftertreatment equipment 80 needs to meet or exceed a selected threshold temperature. Also, for certain regeneration modes, even higher temperatures need to be reached from time-to-time. These regeneration modes can include "recharging" the adsorber catalyst bed 84 by providing a rich fuel mixture with a higher temperature compared to nominal aftertreatment operation to release trapped nitrogen oxides as molecular nitrogen ($N_2$), water vapor, or the like; a less frequent sulfur oxide purge of bed 82 at high temperature; and a particle burn-off for particle filter 86 at elevated temperature. In other embodiments, aftertreatment equipment 80 may include more, fewer, or different stages. For example, in one alternative embodiment, absorber catalyst bed 84 is not present, including only bed 82 and filter 86. In still other embodiments, a different aftertreatment arrangement can be utilized and/or may be absent altogether.

For a nominal combustion mode of operation of cylinders 12a-12h, controller 42 determines an appropriate amount of fueling as a function of the engine speed signal ES from engine speed sensor 44 as well as a one or more other parameters; and generating corresponding fueling command output signals FC, with appropriate timing relative to ignition, using techniques known to those skilled in the art. Controller 42 also executes logic to regulate various other aspects of engine operation based on the various sensor inputs available, and to generate corresponding control signals with outputs FC, EGRV, VGT, or one or more others (not shown). Furthermore, in some applications it is desirable to control one or more aspects of the operation of system 10 based on a temperature of the exhaust output by engine 12 and/or turbine 26.

Figure 2:
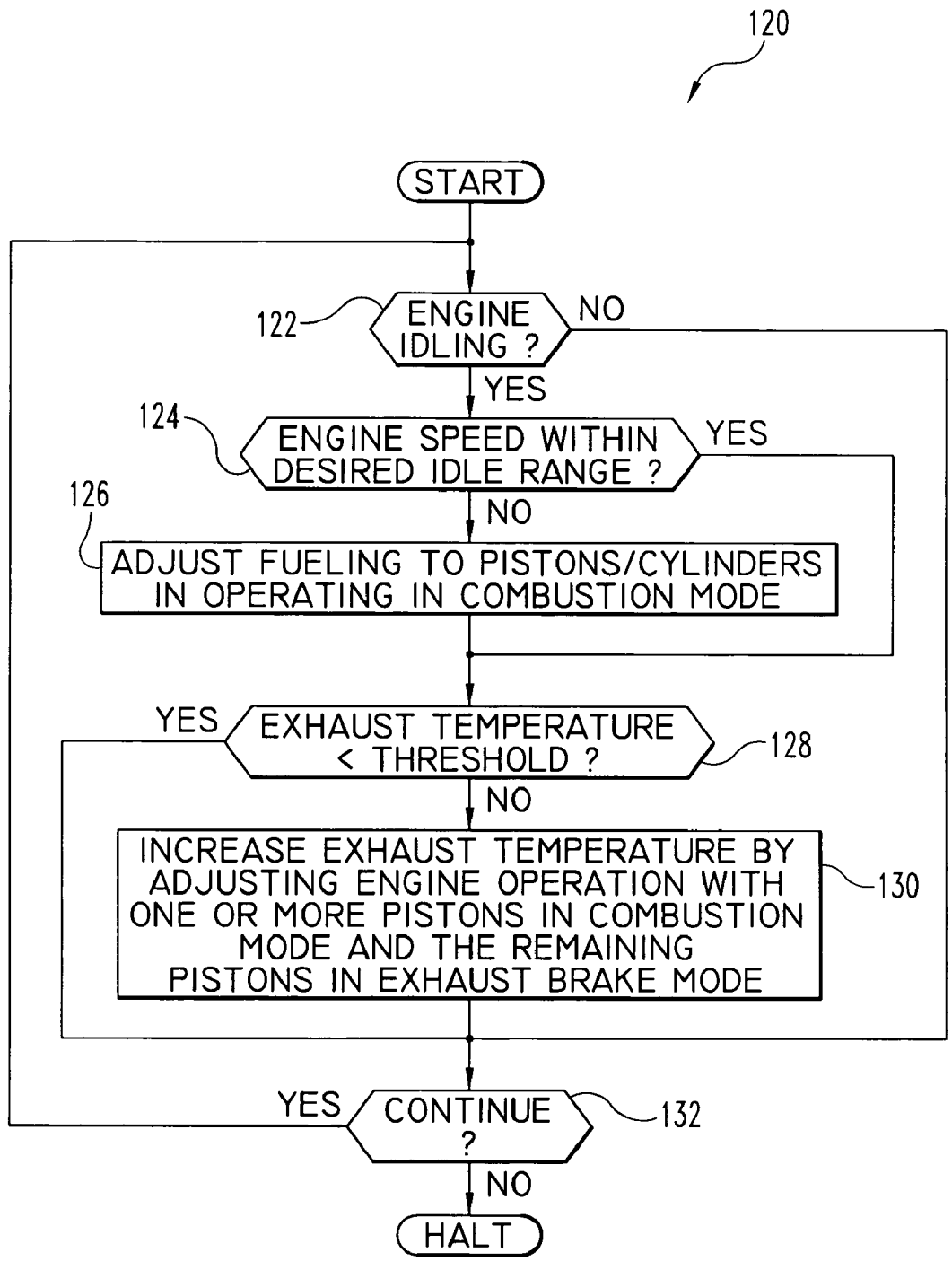
FIG. 2 is a flowchart corresponding to a thermal management procedure for operating the aftertreatment equipment of FIG. 1 with the engine idling.

For example, FIG. 2 illustrates exhaust temperature control procedure 120 in flowchart form, which can be implemented with system 10 using appropriate operating logic executed by controller 42. Procedure 120 is directed to elevating exhaust temperature to a level desired to operate aftertreatment equipment 80 when engine 12 is under a low load condition because it is idling. Procedure 120 begins with conditional 122. Conditional 122 tests whether engine 12 is idling. If the test of conditional 122 is negative (NO) then procedure 120 continues with conditional 132. Conditional 132 tests whether to continue procedure 120 or to halt procedure 120. If the test of conditional 132 is negative (NO), procedure 120 stops. If the test of conditional 132 is positive (YES) then procedure 120 returns to repeat conditional 122.

If the test of conditional 122 is positive (YES) then procedure 120 continues with conditional 124. Conditional 124 tests whether the engine speed ES as determined with sensor 44 is within a desired idle speed range. The target idle speed or desired idle speed range can be an invariant, static quantity or can dynamically vary with one or more engine calibration or performance parameters, such as inputs from sensors and/or results determined with controller 42. If the test of conditional 124 is positive (YES), such that the idle speed is appropriate, then conditional 128 is performed.

Conditional 128 tests whether the temperature of the exhaust is at a minimum threshold value desired to perform aftertreatment. This threshold value may vary with performance conditions of the aftertreatment equipment 80 and/or engine 12; however, it typically corresponds to the lowest temperature needed for nominal aftertreatment operation. This temperature level can be difficult to reach when engine 12 is lightly loaded, such as the usual case when idling. In one embodiment the test of conditional 128 relies upon data gathered by exhaust manifold temperature sensor 74 which is transmitted to exhaust manifold temperature input EMT of controller 42 via signal path 74a. In an alternative embodiment, an exhaust temperature sensor may be placed in conduit 34, pathway 33, and/or aftertreatment equipment 80 and communicate with a corresponding exhaust temperature input of controller 42. In still another alternative, exhaust temperature at the turbine outlet of turbocharger 18 is estimated using other engine parameters as described in U.S. patent application Ser. No. 11/325,170 filed on 4 Jan. 2006, which is hereby incorporated by reference.

If the test of conditional 128 is negative (NO), procedure 120 continues with operation 130. Operation 130 is directed to increasing the temperature of exhaust produced by engine 12 by operating one subset of the pistons P1-P8 in a brake mode and another subset of the pistons in a combustion mode. There is no fuel provided to the cylinders 12a-12h operating in the brake mode. Instead, pistons P1-P8 operating in the brake mode present an additional mechanical load for any pistons P1-P8 operating in the combustion mode. This additional load causes the pistons P1-P8 operating in the combustion mode to generate hotter exhaust gases as will be more fully described hereinafter. In one embodiment four of pistons P1-P8 operate in the combustion mode while four of pistons P1-P8 operate in exhaust brake mode; however, other groupings are contemplated. Moreover, operation 120 can include dynamically changing the ratio of pistons P1-P8 participating in the brake mode and the combustion mode. Such changes can be made in response to temperature feedback, the amount of time engine 12 has been executing procedure 120 and/or idling, various operational limits, engine operating parameters, or the like. Alternatively, swapping pistons P1-P8 between the two modes can be performed in different embodiments with or without maintaining the same brake mode/combustion mode piston ratio. Furthermore, it should be understood that in alternative embodiments engine 12 may have more or fewer cylinders/pistons relative to that shown in FIG. 1. It should be further understood that the ratio of pistons P1-P8 operating in combustion mode to the number of pistons P1-P8 operating in exhaust brake mode is typically related to the degree of exhaust temperature increase. The determination of this ratio and the specific selection of which pistons P1-P8 operate in brake mode versus combustion mode is performed in accordance with operating logic of controller 42, which issues corresponding engine brake command outputs EB and fuel command outputs FC during operation 130. As a result of this additional loading by the brake mode, the combustion mode pistons P1-P8 operate with more fuel, generating more heat, and commensurately raising the exhaust temperature.

After execution of operation 130, procedure 120 continues with conditional 132, which as previously described, tests whether to continue or halt. A positive (YES) result for the test of conditional 128 reaches conditional 132 directly, bypassing operation 130. Provided that the test of conditional 132 remains true, procedure 120 loops back to repeat conditional 122. Otherwise, procedure 120 halts when conditional 132 is negative. Upon looping back to conditional 122, and provided that conditional 122 remains true, conditional 124 is again encountered. If the idle speed remains in a desired range, conditional 128 is again encountered; however, if the test of conditional 124 is negative (NO), then operation 126 is performed.

Operation 126 is directed to adjusting the amount of fuel supplied to any pistons P1-P8 located in cylinders (12a-12h) which are operating in a combustion mode. Because those pistons P1-P8 operating in exhaust brake mode increase the load on the remaining pistons P1-P8 operating in combustion mode, an increase in the amount of fuel provided to the combustion mode pistons P1-P8 is typically needed to maintain the same engine speed, otherwise a drop in engine speed occurs. For example, after initially operating one or more pistons P1-1P8 in the brake mode through execution of operation 130, idle speed may decrease to such an extent that the next time conditional 124 is performed, there is a negative result, leading to performance of operation 126. Accordingly, operation 126 increases fuel supplied to combustion mode pistons P1-P8 as controlled by the fuel command outputs FC of controller 42. This increase in fuel to maintain engine idle speed likewise generates more heat, elevating exhaust temperature. Correspondingly, the increased loading caused by brake mode operation of a piston subset results in increased fueling of the combustion mode piston subset to maintain a desired idle speed, which in turn causes exhaust temperature to increase. If the idle speed is above the desired level, the adjustment in operation 126 decreases fueling, as may occur when the desired exhaust temperature is reached, the desired idle speed level changes, or one or more other conditions change that are favorable to such a downward adjustment.

After the performance of operation 126, procedure 120 continues with conditional 128, which as previously described, tests whether to increase the exhaust temperature relative to a threshold level. Like the idle speed comparison of conditional 124, it should be appreciated that this exhaust temperature threshold can be invariant in one embodiment or dynamically vary with one or more operating conditions in another embodiment. It should further be appreciated that the alternative execution of operations 126 and 130 elevates exhaust temperature up to the threshold value and correspondingly controls engine idle speed throughout a given idle period (as long as conditional 122 is true). As execution of operation 130 is repeated during idle operation in some implementations of procedure 120, the number of pistons in brake mode operation versus combustion mode operation may change in accordance with a predefined schedule based on the amount of exhaust temperature change noted from prior performance(s) of operation 130, changes in engine operating parameters, idle speed variance, or the like. Nonetheless, in other implementations, the braking/combustion assignment is not dependent on such factors.

Many other embodiments of the present invention are also envisioned. For example, in other embodiments, one or more additional forms of engine loading are used to augment the dynamic adjustment of engine load through exhaust braking. In another example, temperature associated with desired operation of aftertreatment equipment is additionally or alternatively raised through the catalytic oxidation of a rich fuel mixture supplied to such equipment or using a different technique as would occur to those skilled in the art. In still other examples, elevation of exhaust temperature is performed in accordance with the present application for a reason other than aftertreatment, and indeed, aftertreatment equipment may or may not be included in such applications.

In yet another example, operation of an internal combustion engine system is regulated at idle to increase exhaust temperature for enhanced aftertreatment performance. This system includes an engine with a set of pistons and aftertreatment equipment to receive exhaust from the engine for the control undesirable emissions. This regulation includes providing for operation of a first subset of the pistons in a combustion mode and a second subset of the pistons in a brake mode, increasing temperature of exhaust produced with the first subset of the pistons by operating the second subset of the pistons in the brake mode to increase mechanical loading of the first subset, adjusting fuel provided to the pistons in the first subset to maintain a desired idle speed of the engine as the temperature of the exhaust increases, and changing the quantity of pistons in the first subset and the second subset to adjust regulation of the engine system while idling.

A further example is directed to a system that includes an engine with a set of pistons and aftertreatment equipment to control undesirable emissions from the engine. This system includes means for increasing temperature of exhaust while the engine is at idle. As the temperature of the exhaust increases, means for adjusting fuel provided to the pistons of the first subset maintains a desired idle speed of the engine. In one form, the increasing temperature means includes means for operating one or more of the pistons in a combustion mode and means for operating one or more other of the pistons in an exhaust brake mode. Alternatively or additionally, this embodiment includes means for increasing mechanical load on a subset of pistons during idle engine operation while regulating idle speed of the engine.

Still a further example of the present invention comprises providing an internal combustion engine including a plurality of pistons and aftertreatment equipment. Operation of this engine at idle includes: powering the engine with a first number of the pistons operating in combustion mode, increasing temperature of exhaust produced by the first number of pistons to heat the aftertreatment equipment to a desired operational level through loading the engine with a second number of pistons operating in brake mode, and adjusting fueling provided to the first number of pistons operating in the combustion mode to maintain a desired idle speed of the engine as the temperature of the exhaust increases.

Yet a further example includes: an internal combustion engine with a plurality of pistons and aftertreatment equipment and means for operating the engine at idle to increase exhaust temperature for desired operation of the aftertreatment equipment. This operating means includes means for powering the engine with a first number of the pistons in a combustion mode, means for increasing temperature of exhaust by the first number of the pistons through mechanical loading with a second number of pistons operating in a brake mode, and means for adjusting fuel provided to the first number of pistons operating in the combustion mode to maintain a desired idle speed of the engine as the temperature of the exhaust increases.

A different example of another embodiment of the present invention is directed to an internal combustion engine system that includes an engine with a set of pistons, aftertreatment equipment, and a controller. The controller is responsive to one or more inputs to designate a first subset of the pistons to operate in a combustion mode and a second subset of the pistons to operate in an engine brake mode during idle operation of the engine. The first subset of the pistons drives the engine producing an exhaust temperature based on loading of the engine by the second set of the pistons operating in the exhaust brake mode. The controller further is operable to adjust fuel provided to the first subset of pistons operating in the combustion mode to maintain engine speed within a desired idle speed range as the temperature of the exhaust increases. This temperature increase can be directed to heating aftertreatment equipment to a desired level.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method, comprising: providing an internal combustion engine including a plurality of pistons each and aftertreatment equipment, the plurality of pistons corresponding to a plurality of respective cylinders and a plurality of respective exhaust valves, operation of the engine at idle including:
powering the engine with a first number of the pistons operating in a combustion mode;
by loading the engine with a second number of the pistons operating in a brake mode, increasing temperature of exhaust produced by the first number of pistons to heat the aftertreatment equipment to a desired operational level, wherein the brake mode includes pumping air in and out of the respective cylinders through the respective exhaust valves corresponding to the second number of pistons; and
adjusting fueling provided to the first number of pistons operating in the combustion mode to maintain a desired idle speed of the engine as the temperature of the exhaust increases.

2. The method of claim 1, which includes:
determining the temperature of the exhaust; and
in response to the determining, dynamically changing the first number to a third number and the second number to a fourth number.

3. The method of claim 1, wherein the first number and the second number are equal.

4. The method of claim 1, wherein the first number is one or more and the second number is total piston quantity less the first number.

5. The method of claim 1, which includes determining engine speed with a sensor and performing the adjusting of the fueling as a function of the engine speed.

6. The method of claim 1, wherein the desired idle speed is any engine speed within a predefined idle speed range.

7. The method of claim 1, wherein the engine further includes a turbocharger and the aftertreatment equipment includes a first catalyst bed to perform oxidation, a second catalyst bed to reduce NOx, and a particle filter.

8. A method, comprising: regulating operation of an internal combustion engine system at idle, the system including an engine with a set of pistons and aftertreatment equipment to control emission from the engine, which includes:
providing for operation of a first subset of the pistons in a combustion mode and a second subset of the pistons in a brake mode, the second subset of pistons each being disposed in a respective cylinder, wherein the brake mode includes pumping air in and out of the respective cylinder through at least one respective exhaust valve;
increasing temperature of exhaust produced with the first subset of the pistons by operating the second subset of the pistons in the brake mode;
as the temperature of the exhaust increases, adjusting fuel provided to the pistons in the first subset to maintain a desired idle speed of the engine; and
changing quantity of the pistons in the first subset and the second subset to adjust the regulating of the engine system at idle.

9. The method of claim 8, which includes determining the temperature of the exhaust and performing the changing of the quantity in response to the temperature of the exhaust.

10. The method of claim 8, which includes determining engine speed with a sensor and performing the adjusting of the fuel as a function of the engine speed.

11. The method of claim 8, wherein the desired idle speed is any engine speed within a predefined idle speed range.

12. The method of claim 8, wherein the fuel is of a diesel type and the engine system further includes a turbocharger, and the aftertreatment equipment includes a particle filter and a catalyst bed.

13. The method of claim 8, wherein the changing includes incrementally increasing a number of the pistons operating in the brake mode to increase mechanical loading of the engine.

14. The method of claim 8, wherein the first subset numbers one or more pistons and the second subset includes all of the pistons not in the first subset.

15. An apparatus, comprising: an internal combustion engine system including an engine with a set of pistons and aftertreatment equipment, the set of pistons corresponding to a plurality of respective cylinders and a plurality of respective exhaust valves, the system including means for operating the engine at idle, the operating means including:

means for driving the engine with a first subset of the pistons operating in a combustion mode;

means for increasing temperature of exhaust produced by the first subset of pistons to heat the aftertreatment equipment to a desired operational level by loading the engine with a second subset of the pistons operating in a brake mode, wherein the brake mode includes means for pumping air in and out of the respective cylinders through the respective exhaust valves corresponding to the second subset of pistons; and means for adjusting fuel provided to the first subset of pistons operating in the combustion mode to maintain a desired idle speed of the engine as the temperature of the exhaust increases.

16. The apparatus of claim 15, wherein the operating means further includes means for changing quantity of pistons in the first subset and the second subset in response, the first subset numbering one or more and the second subset including all of the pistons in the set that are not in the first subset.

17. The apparatus of claim 15, further comprising a sensor to determine rotational speed of the engine.

18. The apparatus of claim 15, further comprising means for determining the temperature of the exhaust.

19. The apparatus of claim 15, wherein the system further includes a turbocharger and the aftertreatment equipment includes means for oxidizing and a particle filter.

20. The apparatus of claim 19, wherein the aftertreatment system further includes a catalyst bed to reduce NOx.

\* \* \* \* \*